Nov. 8, 1960  A. B. WELTY, JR  2,959,537
FLUID HYDROFORMING PROCESS AND APPARATUS
Filed Oct. 1, 1957
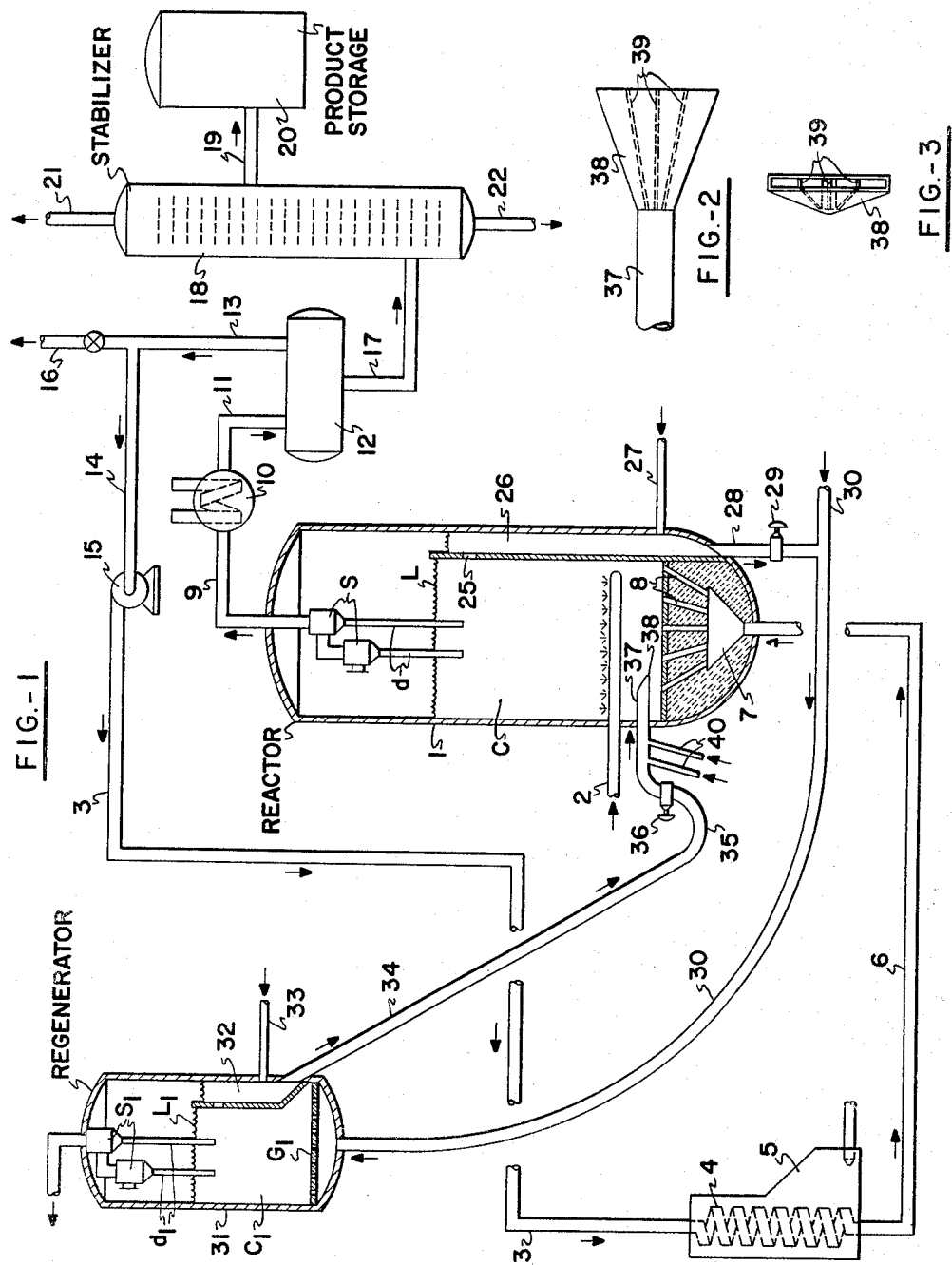
Albert B. Welty, Jr.  Inventor
By H. M. Feyrer  Attorney

United States Patent Office 2,959,537
Patented Nov. 8, 1960

2,959,537

FLUID HYDROFORMING PROCESS AND APPARATUS

Albert B. Welty, Jr., Westfield, N.J., assignor to Esso Research and Engineering Company, a corporation of Delaware Filed Oct. 1, 1957, Ser. No. 687,426

3 Claims. (Cl. 208—164)

The present invention relates to improvements in hydroforming and more particularly relates to an improved method of providing more efficient contact between vapors and fluidized catalytic solids during the hydroforming operation.

More particularly, the present invention relates to a method for causing more rapid mixing of regenerated catalyst entering the reaction zone with the dense fluidized bed of catalyst in the reaction zone whereby carbon formation on the catalyst is reduced and as a result the activity of the catalyst is maintained at a high level.

It is now a matter of record in commercial practice to apply the fluidized solids technique to vapor phase reactions. This technique, wherein a dense, fluidized, turbulent bed of finely divided solids is contacted with gasiform or vaporiform material in a reaction zone tends to provide, in commercial operations, good contact between solids and gases or vapors and homogeneous temperatures throughout the bed. In addition, it permits continuous operation in the case where the solids are catalytic since they may be readily withdrawn and regenerated in a second vessel and returned to the reaction zone.

However, the hydroforming of naphthas has presented a problem which is peculiar in this type of operation. As is known, hydroforming is an operation in which a naphtha is contacted at elevated temperatures and pressures, in the presence of added hydrogen, with a reducible metal oxide, such as molybdenum oxide. The present improvements relate to a process carried out in the system consisting essentially of two vessels, namely, a reaction vessel with connecting pipes permitting the transfer of fouled or spent catalyst from the reactor to the regenerator wherein the fouled catalyst is treated with air or other oxidizing gas to remove the contaminants formed on the catalyst during the reaction phase, which catalyst is then returned to the reaction zone. In the case where the catalyst consists of 5 to 10 weight percent molybdenum oxide carried on, say, active alumina, the reducible molybdenum oxide is reduced in the reaction to a valence of about five and reoxidized in the regenerator usually to its highest state of valence. When the hot regenerated catalyst is returned to the reaction zone, it undergoes reduction by contact with the reactant mixture. Although the reactant mixture is capable of reducing the molybdenum oxide from the hexavalent to the pentavalent form under normal hydroformer reactor conditions the present studies have shown that this reduction by the oil vapors causes the formation of inordinately large amounts of carbon. It has now been found that, to cure the insufficiency noted, it is necessary to have an ample supply of free hydrogen in the region where the hot regenerated catalyst enters the reaction zone, which in the ordinary case is at a point in the lower portion of the said reaction zone. These studies have also revealed that it is necessary to effect rapid mixing of the incoming regenerated catalyst with the main body of catalyst in the reaction zone and these means are described more fully hereinafter.

The main object of the present invention is to improve the efficiency of a fluidized catalyst hydroforming process by means adapted to prevent premature and/or excessive deposition of carbon on hot freshly regenerated catalyst entering and mixing with a dense fluidized bed of catalyst in a hydroforming zone.

A related object of the present invention is to provide a means for controlling the reduction of a hot regenerated catalyst containing a reducible metal oxide as it enters into contact with a fluidized bed of the same catalyst in a reaction zone.

Another object of the present invention is to provide means for causing rapid mixing with the main body of fluidized catalyst in a hydroforming zone, of a hot, freshly regenerated catalyst containing a reducible metal oxide.

Another object of the present invention is to so operate the fluidized catalyst hydroforming operation in which hot regenerated catalyst containing a reducible metal oxide is fed to the reaction zone for mixing with the dense bed of catalyst that the regenerated catalyst is caused to initially contact an environment of high hydrogen partial pressure as it enters the reaction zone.

A still further object of the invention which relates to the preceding object, is to cause the hot regenerated catalyst to enter the reaction zone in an environment in which the hydrogen is present in an amount exceeding that required to reduce the catalyst whereby carbonization of fouling of the catalyst is hindered or retarded.

In brief compass, the present invention provides means for overcoming the above mentioned insufficiencies encountered in commercial scale hydroforming plants employing a fluidized bed of catalyst containing a reducible metal oxide by injecting regenerated catalyst into the bed through an inlet nozzle reduced in size to the minimum allowable by the pressure drop available thereby increasing the velocity of the incoming regenerated catalyst particles to cause increased agitation and penetration into the fluidized bed of catalyst. These means cause a rapid mixing of the incoming catalyst with the dense fluidized bed. These means may be augmented and the effect enlarged by the following additional means:

(1) Causing increased agitation of the fluidized bed of catalyst by introducing recycle gas just below the regenerated catalyst inlet to give a local gas velocity at the said inlet of 3 or 4 ft./sec.

(2) Disposing a shallow conical target with its apex in juxta-position with respect to the regenerated catalyst inlet whereby the incoming high velocity catalyst stream bombards the said target and is widely dispersed in the fluidized bed of catalyst.

In the accompanying drawing there is shown diagrammatically in Fig. 1 an apparatus layout comprising the essential components of a fluid hydroforming plant equipped with the improved means for injecting regenerated catalyst into the fluidized bed of catalyst in the reaction zone; in Fig. 2 there is shown a top view of the regenerated catalyst injection means and in Fig. 3 there is shown an end view of the catalyst injection means of Fig. 2.

Referring in detail to Figure 1, 1 represents a hydroforming reactor containing a fluidized bed of catalyst C comprising, say, 5 to 10 weight percent molybdenum oxide carried on 90 to 95 weight percent of an active alumina, which catalyst is maintained as a dense fluidized bed by the passage of naphtha feed vapors and recycle gas therethrough, said dense bed having an upper dense phase level or interphase L. In operation feed stock comprising the naphtha preheated to about reaction temperature in a suitable furnace (not shown) enters the present system through line 2 alone or in admixture with hydrogen-rich gas. Recycle gas in line 3 is passed through heater coils 4 in furnace 5 where it is heated to a temperature of 1050° F. to 1175° F.; thence withdrawn through line 6 and charged into the bottom of reactor 1. The recycle gas passes upwardly through inlet core 7 and thence through quills 8 or a perforated grid or other suitable distribution means into the main bed of catalyst C. The space between the inlet cone 7 and the inner wall of the vessel as well as between the quills 8 is desirably filled with any suitable refractory material. The gas and vapor mixture flows upwardly at a superficial velocity sufficient to maintain the bed of catalyst in a fluidized state. This superficial velocity may vary but where the particle size varies from, say, 0 to 200 microns and over 50 percent by weight has a particle size of from 40 to 80 microns, good results are obtained by adjusting the superficial velocity to a value of, say, ½ to 1 ft./sec. Under known conditions of temperature, pressure and contact time the desired hydroforming reaction occurs and the raw product emerges from the catalyst bed C and passes into the catalyst disengaging space positioned between L and the top of the reactor in which space the main bulk of the catalyst is separated from the vapors and returned by gravity to the dense bed C. Before the raw product is withdrawn from the reactor, it is forced through one or more gas-solids separating devices or cyclone separators S wherein entrained catalyst is removed from the vapors and returned to the bed of catalyst C through one or more dip pipes $d$.

The raw product, substantially freed of catalyst, is withdrawn from reactor 1 through line 9, forced through a cooler 10 where it is cooled to a temperature of about 100° F., thence withdrawn from the cooler through line 11 and charged to a liquid-gas separating tank 12 wherein gas and liquid product are separated. The gas is withdrawn overhead through line 13 and conducted via line 14 and pump 15 to line 3 for further use in the process. This is the so-called recycle gas which contains, say, 50 to 60 volume percent hydrogen, the remainder being mostly $C_1$–$C_3$ hydrocarbons. Excess recycle gas may be vented from the system through valve controlled line 16. Referring again to separator 12, the liquid product is withdrawn therefrom through line 17 and delivered to a fractional distillation tower 18 where it is subjected to distillation to recover, via side stream 19, the desired product which is passed to product storage 20. Light ends are withdrawn overhead from fractionator 18 through line 21 while heavy bottoms are withdrawn through line 22. The description so far is a representation in brief form of that portion of a commercial unit in which the heating of the charging stock and the recycle gas as well as the catalytic treatment of these materials and the recovery of desired product is indicated.

As hereinbefore pointed out, the novelty of the present invention relates to the method of returning hot regenerated catalyst to the reaction zone in such a manner as to improve the operation, particularly from the standpoint of protecting the catalyst against injury or deactivation as it initially enters the bed of catalyst C in the reaction zone.

As in conventional practice, the catalyst is withdrawn from the dense bed C through orifice 25 into spent catalyst stripper 26 arranged with the reaction zone. Stripping gas such as steam, nitrogen, recycle gas or the like is supplied to stripper 26 via line 27 and contacts the spent catalyst counter-currently to strip off entrained and adsorbed hydrocarbons which are discharged above the dense bed level L and recovered with the main stream of reaction products. The stripped catalyst particles are discharged into standpipe 28 which is provided with aeration taps and a flow control or slide valve 29 and thence into a stream of air in transfer line 30 through which they are conveyed into the bottom of a regenerator 31 where they are again formed into a dense fluidized bed C′, extending from a gas distributing means $G_1$ to an upper dense phase level $L_1$. The stream of catalyst passes from line 30 into the bottom of regenerator 31 and thence upwardly into the grid $G_1$ where, as in the case of reactor 1, gas velocities are controlled to form the catalyst into a dense fluidized bed. Under known conditions of temperature and reaction time, the contaminating deposits formed on the catalyst during the hydroforming phase are burned off the catalyst and the resulting fumes pass into the disengaging space between $L_1$ and the top of the regenerator wherein entrained catalyst is separated from the fumes and gravitated toward bed $C_1$. Before the fumes are withdrawn from the regenerator, they are forced through one or more gas-solid separators or cyclones $S_1$ wherein entrained catalyst is separated from the fumes and returned to the bed $C_1$ through one or more dip pipes $d_1$.

According to the present invention, catalyst is withdrawn from the dense bed $C_1$ in regenerator 31 into a stripper cell 32 wherein it is stripped of regeneration gases by means of a stripping gas such as steam, nitrogen or scrubbed flue gas supplied through line 33. The stripped regenerated catalyst particles pass into standpipe 34 and thence through U-bend 35 and slide or control valve 36 and are discharged into reactor 1 through catalyst inlet 37. For best results standpipe 34 is preferably provided with a plurality of gas taps through which aeration gas may be supplied to increase catalyst mobility or reestablish fluidity when there has been a stoppage of flow. The catalyst inlet 37 is extended a substantial distance into the reactor, preferably about one fourth of the diameter of the vessel and the discharge end 38 is swaged or formed like a fan or fishtail in order to discharge the regenerated catalyst as a wide, shallow stream. Vanes or baffles 39 are preferably provided in the swaged portion 38 in order to insure more uniform distribution of the catalyst to the nozzle. Figs. 2 and 3 illustrate a little more in detail the manner in which the discharge end of the regenerated catalyst inlet is swaged and baffled in order to improve the distribution of the catalyst into the reactor dense bed.

The effect of flattening or swaging the discharge end 38 or inlet pipe 37 is to diminish the area of the outlet so that the stream of catalyst is projected from the outlet into the body of the catalyst C at a greatly increased velocity so that it is caused to penetrate into the body of the catalyst C and be rapidly mixed with the dense bed of catalyst. To augment or increase this effect aeration gas, preferably nitrogen, scrubbed flue gas or else steam is injected into line 37 via lines 40 whereby the velocity of the solids is greatly increased say to 25–50 ft. per second at the nozzle outlet and therefore its penetrating power into the bed of catalyst C is increased.

The means shown provide a very rapid mixing of freshly regenerated catalyst with the main body in the reactor and also provide ample hydrogen for the entering regenerated catalyst to cause partial reduction thereof and additional hydrogen to prevent serious carbonization of the catalyst which initially is in a very active state.

The following example is illustrative of the process in accordance with this invention.

Example: a wide boiling range virgin naphtha is hydroformed to a high octane number product in a fluidized solids hydroforming system under the following conditions. Operative ranges for the several variables are also indicated.

|  |  | Range |
|---|---|---|
| Temperatures, °F.: |  |  |
| Catalyst in Reactor | 900 | 875–975 |
| Catalyst entering Reactor | 1,102 | 1,050–1,150 |
| Catalyst in Regenerator | 1,105 | 1,100–1,175 |
| Feed to Reactor | 990 | 900–1,000 |
| Recycle Gas to Reactor | 1,081 | 1,050–1,175 |
| Reactor Pressure, #/sq. in. ga | 220 | 50–500 |
| Recycle Gas Rate, c.f. (@ 60° F. and 760 mm.)/Bbl. oil feed | 4,000 | 2,000–8,000 |
| Ratio of Catalyst to Oil Fed to Reactor, # Cat./# oil | 1.50 | 0.5–2.0 |
| Average Residence Time of Catalyst in Reactor, Minutes | 95 | 60–360 |
| Oil Feed Rate # oil/# Cat./Hr | 0.42 | 0.3–1.0 |
| Superficial Gas Velocity in Reactor, Ft./sec | 0.78 | 0.4–1.25 |
| Density of Catalyst Bed in Reactor, #/c.f. | 42 | 35–45 |
| Catalyst Composition wt. percent Molybdena (as $MoO_3$) on gamma alumina | 8 | 3–15 |
| Conditions in Pipe and Special Flared Inlet Where Catalyst Enters Reactor Bed: |  |  |
| Density, # Cat./c.f. | 4.8 | 3–6 |
| Superficial Velocity, Ft./sec.— |  |  |
| Before Flare |  | 10–15 |
| At End of Flare |  | 25–50 |

It is to be understood that this invention is not limited to the specific embodiment since numerous variations are possible without departing from the scope of the following claims.

What is claimed is:

1. In a fluidized catalytic hydroforming process comprising hydroforming naphtha in the presence of hydrogen containing gas in a reactor vessel containing a fluidized bed of reducible metal oxide catalyst, continuously withdrawing the hydroformed naphtha and the hydrogen-containing gas from the reactor vessel, recycling the hydrogen-containing gas to the lower portion of the reactor vessel, continuously withdrawing the deactivated catalyst from the reactor vessel, passing the deactivated catalyst to a regenerator vessel wherein carbonaceous deposits are burned from the deactivated catalyst and recycling the regenerated catalyst to the reactor vessel; the improvement wherein the regenerated catalyst is recycled to the lower portion of the fluidized bed of catalyst in the reactor vessel and injected into said bed at a velocity in the range of about 25 to 50 feet per second in close proximity to the incoming stream of hydrogen-containing gas and below the level at which the naphtha feed is introduced.

2. In a reactor vessel for hydroforming naphtha having a fluidized bed of reducible metal oxide catalyst, a catalyst removal means for removing deactivated catalyst particles from the fluidized bed, a recycle gas distributing means located at the bottom of the fluidized bed of catalyst particles, a catalyst inlet line for introducing regenerated catalyst to the fluidized bed of catalyst, and inlet and distributor means for supplying naphtha feed arranged within the reactor above and in spaced relation to the regenerated catalyst inlet means, the improvement wherein the regenerated catalyst inlet line, located at the lower portion of the fluidized bed in close proximity to the recycle gas distributing means, is flared and flattened at its discharge end to form a fan-shaped outlet nozzle to improve the distribution of regenerated catalyst into the reactor and a gas inlet line connected to the said catalyst inlet line to increase the velocity of the regenerated catalyst passing from said outlet nozzle into the fluidized bed of catalyst.

3. The reactor vessel defined in claim 2 in which vertical baffles are provided in said fan-shaped portion to further improve the distribution of catalyst therethrough.

References Cited in the file of this patent

UNITED STATES PATENTS

| 157,256 | Wiard | Nov. 24, 1874 |
| 469,211 | Kline | Feb. 16, 1892 |
| 2,652,317 | Rees et al. | Sept. 15, 1953 |
| 2,718,714 | Bocchino | Sept. 27, 1955 |
| 2,721,167 | Nicholson | Oct. 18, 1955 |
| 2,725,341 | Gornowski et al. | Nov. 29, 1955 |
| 2,751,322 | Gornowski et al. | June 19, 1956 |
| 2,763,599 | Abeel et al. | Sept. 18, 1956 |